(12) United States Patent  
Yu

(10) Patent No.: US 7,760,445 B2  
(45) Date of Patent: Jul. 20, 2010

(54) COMPOUND LENS AND COMPOUND LENS ARRAY

(75) Inventor: Tai-Cherng Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/189,649

(22) Filed: Aug. 11, 2008

(65) Prior Publication Data

US 2009/0190227 A1 Jul. 30, 2009

(30) Foreign Application Priority Data

Jan. 30, 2008 (CN) .................. 2008 1 0300272

(51) Int. Cl.
 *G02B 9/00* (2006.01)
 *G02B 27/10* (2006.01)
(52) U.S. Cl. ....................... 359/796; 359/619
(58) Field of Classification Search ............... 359/796, 359/797, 619, 740, 717, 718, 722
See application file for complete search history.

(56) References Cited

U.S. PATENT DOCUMENTS 5,684,636 A * 11/1997 Chow et al. .................. 359/665
6,084,724 A * 7/2000 Wiegand et al. ............. 359/796
7,336,422 B2 * 2/2008 Dunn et al. .................. 359/619

* cited by examiner

*Primary Examiner*—Alicia M Harrington
(74) *Attorney, Agent, or Firm*—Andrew C. Cheng

(57) ABSTRACT

An exemplary compound lens includes a rigid light pervious layer, a first plastic lens, and a second plastic lens. The rigid light pervious layer includes a first surface and a second surface opposite to the first surface. The first plastic lens is attached on the first surface, and is comprised of a first material. The second plastic lens is formed on the second surface, and is comprised of a second material. A refractive index of the first material is different from that of the second material. An optical axis of the first plastic lens is in alignment with an optical axis of the second plastic lens.

19 Claims, 11 Drawing Sheets

COMPOUND LENS AND COMPOUND LENS ARRAY

BACKGROUND

1. Technical Field

The present invention relates to a compound lens, and particularly, to compound lenses that can be produced in an array format using wafer-level techniques.

2. Description of Related Art

Camera modules have been widely used in portable electronic devices (e.g., mobile phones). Lenses used in the camera modules of the portable electronic devices are conventionally made by injection molding. Thicknesses of the lenses made by injection molding are usually more than 0.3 millimeters.

Nowadays, the portable electronic devices have become more light-weight, and smaller in volume. Generally, a thickness of the portable electronic device is limited by a height of a camera module received in the portable electronic device. It is required for the camera modules and the lenses of the camera modules to have a small size. However, it is difficult to produce small lenses with a thickness less than 0.3 millimeters using injection molding.

Therefore, a new compound lens and a new compound lens array are desired to overcome the above mentioned problems.

SUMMARY

An exemplary compound lens includes a rigid light pervious layer, a first plastic lens, and a second plastic lens. The rigid light pervious layer includes a first surface and a second surface opposite to the first surface. The first plastic lens is attached on the first surface, and is comprised of a first material. The second plastic lens is formed on the second surface, and is comprised of a second material. A refractive index of the first material is different from that of the second material. An optical axis of the first plastic lens is in alignment with an optical axis of the second plastic lens.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
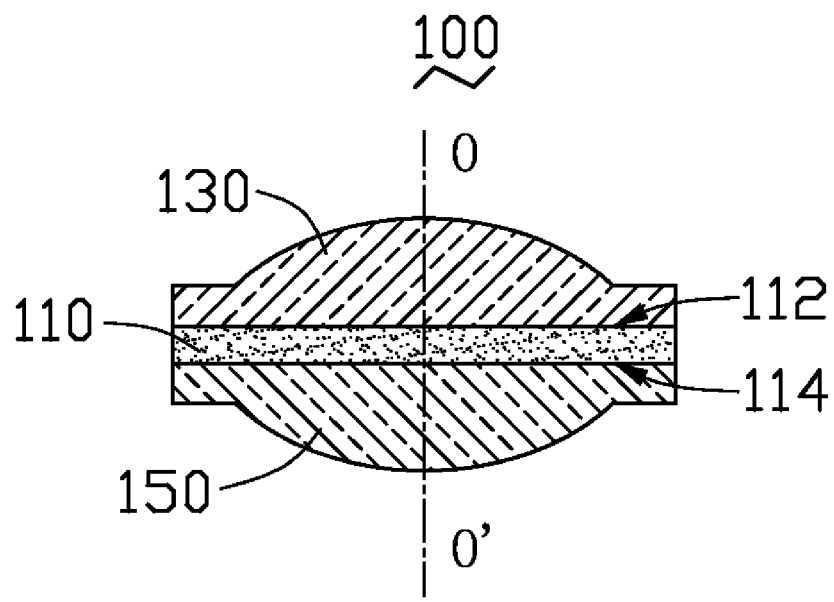
FIG. 1 is a schematic, side cross-sectional view of a compound lens, in accordance with a first embodiment.

Referring to FIG. 1, a compound lens 100 according to a first embodiment is shown. The compound lens 100 includes a rigid light pervious layer 110, a first plastic lens 130 and a second plastic lens 150.

The light pervious layer 110 includes a first surface 112 and a second surface 114 opposite to the first surface 112. The light pervious layer 110 can be made of glass or quartz. The pervious layer 110 is a flat sheet. The first plastic lens 130 is embossed on the first surface 112 of the pervious layer 110 using, e.g., ultraviolet (UV) embossing. The first plastic lens 130 is a plane convex lens with a convex surface facing away from the first surface 112. The second lens 150 is embossed on the second surface 114 of the pervious layer 110 using, e.g., UV embossing. The second plastic lens 150 is a plane convex lens with a convex surface facing away from the second surface 1114. An optical axis OO' of the first plastic lens 130 is in alignment with that of the second plastic lens 150. The first lens 130 and the second lens 150 can be made of a material with a refractive index in an approximate range from 1.4 to 1.6. The first lens 130 and the second lens 150 are made of different materials with different refractive indexes.

Figure 2:
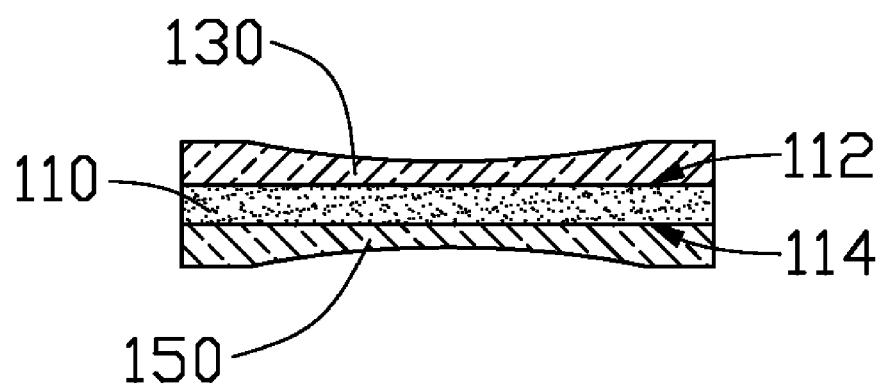
FIG. 2 is a schematic, side cross-sectional view of a compound lens, in accordance with a second embodiment.
Figure 3:
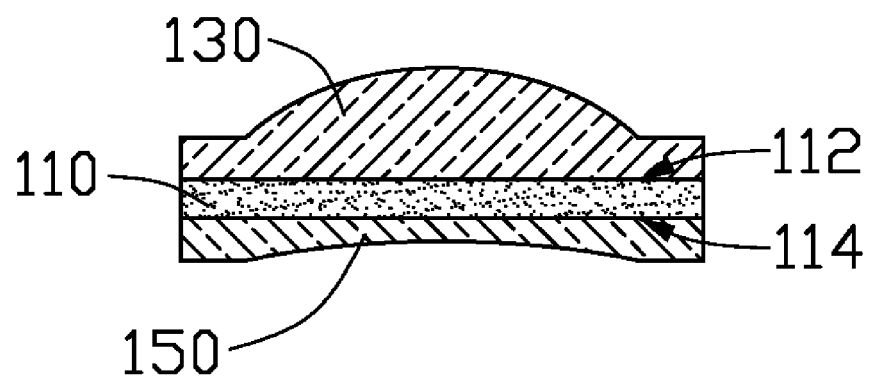
FIG. 3 is a schematic, side cross-sectional view of a compound lens, in accordance with a third embodiment.
Figure 4:
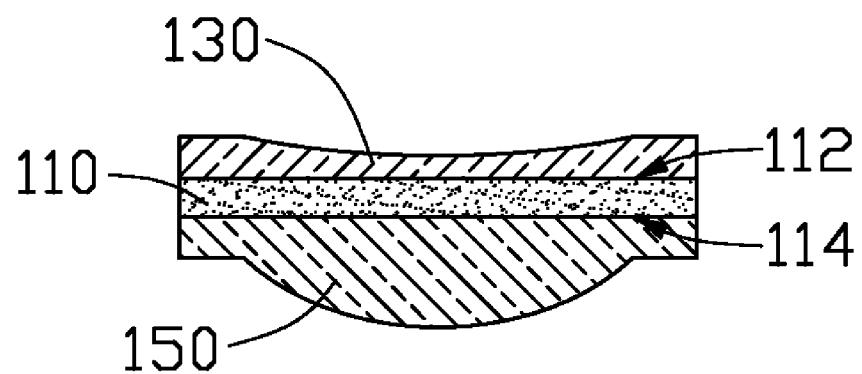
FIG. 4 is a schematic, side cross-sectional view of a compound lens, in accordance with a fourth embodiment.

In the present embodiment, the first plastic lens 130 and the second plastic lens 150 are both plane convex lenses, thus cooperatively forming a bioconvex lens. It should be noted that the compound lens can be other configurations such as shown in FIGS. 2-4. Referring to FIG. 2, a compound lens 100 according to a second embodiment is shown. Both of the first plastic lens 130 and the second plastic lens 150 are plane concave lenses, thus cooperatively forming a bioconcave lens. Referring to FIG. 3, a compound lens 100 according to a third embodiment is shown. The first plastic lens 130 is a plane convex lens, and the second plastic lens 150 is a plane concave lens. Referring to FIG. 4, a compound lens 100 according to a fourth embodiment is shown. The first plastic lens 130 is a plane concave lens, and the second plastic lens 150 is a plane convex lens.

Figure 5:
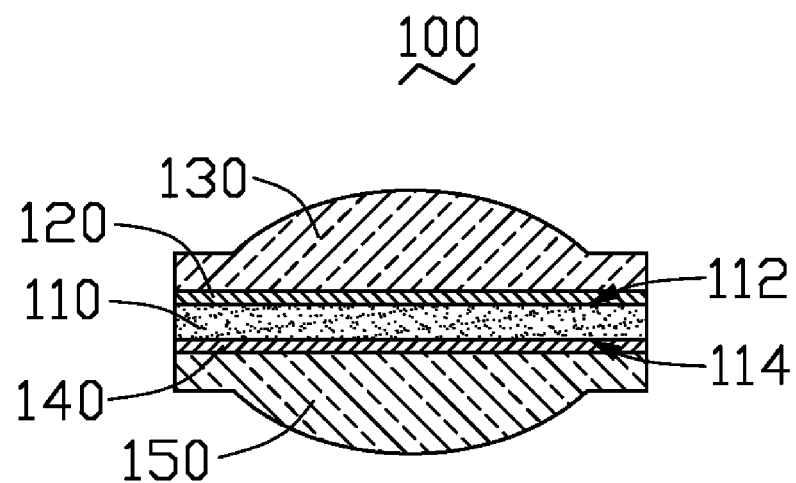
FIG. 5 is a schematic, side cross-sectional view of a compound lens, in accordance with a fifth embodiment.

Referring to FIG. 5, a compound lens 100 according to a fifth embodiment is shown. The compound lens 100 of FIG. 5 is similar to the compound lens 100 of FIG. 1 except that the compound lens 100 of FIG. 5 further includes a filter layer 120 and an anti-reflection layer 140. The filter layer 120 is sandwiched between the rigid light pervious layer 110 and the first lens 130, and the anti-reflection layer 140 is sandwiched between the rigid light pervious layer 110 and the second lens 150. The filter layer 120 selectively transmits light having certain properties (often, a particular range of wavelengths), while blocking the remainder. The filter layer 120 can be, for example, an infrared-cut filter or an infrared band pass filter. The anti-reflection layer 140 is configured for reducing reflection.

Figure 6:
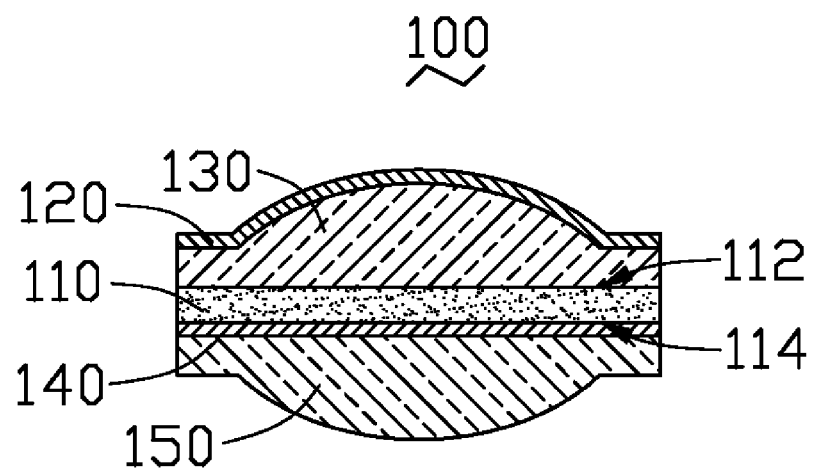
FIG. 6 is a schematic, side cross-sectional view of a compound lens, in accordance with a sixth embodiment.

It should be noted that the filter layer 120 can be formed on a surface of the first lens 130 facing away from the surface 112 (see FIG. 6) or on a surface of the second lens 150 facing away from the surface 114.

It is also to be understood that the anti-reflection layer 120 can be formed on a surface of the first lens 130 facing away from the surface 112 or on a surface of the second lens 150 facing away from the surface 114.

Figure 7:
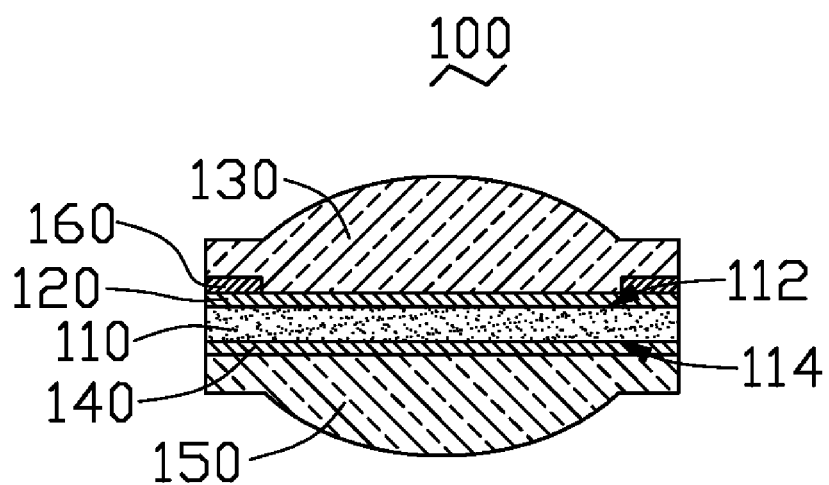
FIG. 7 is a schematic, side cross-sectional view of a compound lens, in accordance with a seventh embodiment.

Referring to FIG. 7, a compound lens 100 according to a seventh embodiment is shown. The compound lens 100 of FIG. 7 is similar to the compound lens 100 of FIG. 5 except that the compound lens 100 of FIG. 7 further includes an aperture layer 160 sandwiched between the filter layer 120 and the first lens 130. The aperture layer 160 has a through hole (not labeled) defined therein. The aperture layer 160 limits the amount of light passing through the compound lens. A thickness of the aperture layer 160 is in an approximate range from 1 micron to 2 microns. The aperture layer 160 can be made of chromium, aluminum, or other suitable materials.

It is to be understood that an aperture layer 160 can be sandwiched between the anti-reflection 140 layer 120 and the second lens 150, applied on a surface of the first lens 130 facing away from the surface 112, or formed on a concave surface of the second lens 150.

It is further to be understood that the quantity of the filter layers 120, the anti-reflection layers 140, and the aperture layers 160 are depending on the practical application.

In addition, a method for making the compound lens 100 is provided. The method will be described as follows.

Firstly, a rigid light pervious layer 11 is provided. The light pervious layer 11 is a wafer level layer. The light pervious layer 11 includes a first surface 102 and a second surface 104 opposite to the first surface 102. The light pervious layer 11 is a flat sheet.

Figure 8:
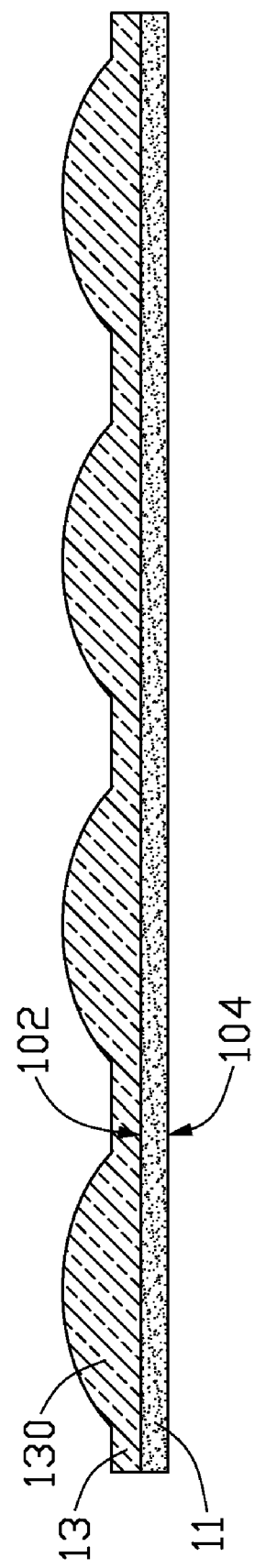
FIG. 8 is a schematic, side cross-sectional view of a light pervious layer with a first plastic lens array formed thereon.

Secondly, referring to FIG. 8, a first plastic lens array 13 is formed on the first surface 102 of the light pervious layer 11 by UV embossing. The first plastic lens array 13 includes a plurality of a first plastic lenses 130. First, a UV curable polymer (not shown) is applied on the first surface 102 of the light pervious layer 11. Then, a replication tool (not shown) with a predetermined pattern is provided. The replication tool can be a press mold, for example, a polydimethylsiloxane (PDMS) press mold. Subsequently, the replication tool is pressed against the UV curable polymer. The UV curable polymer is solidified by UV light to form a first plastic lens array 13.

Figure 9:
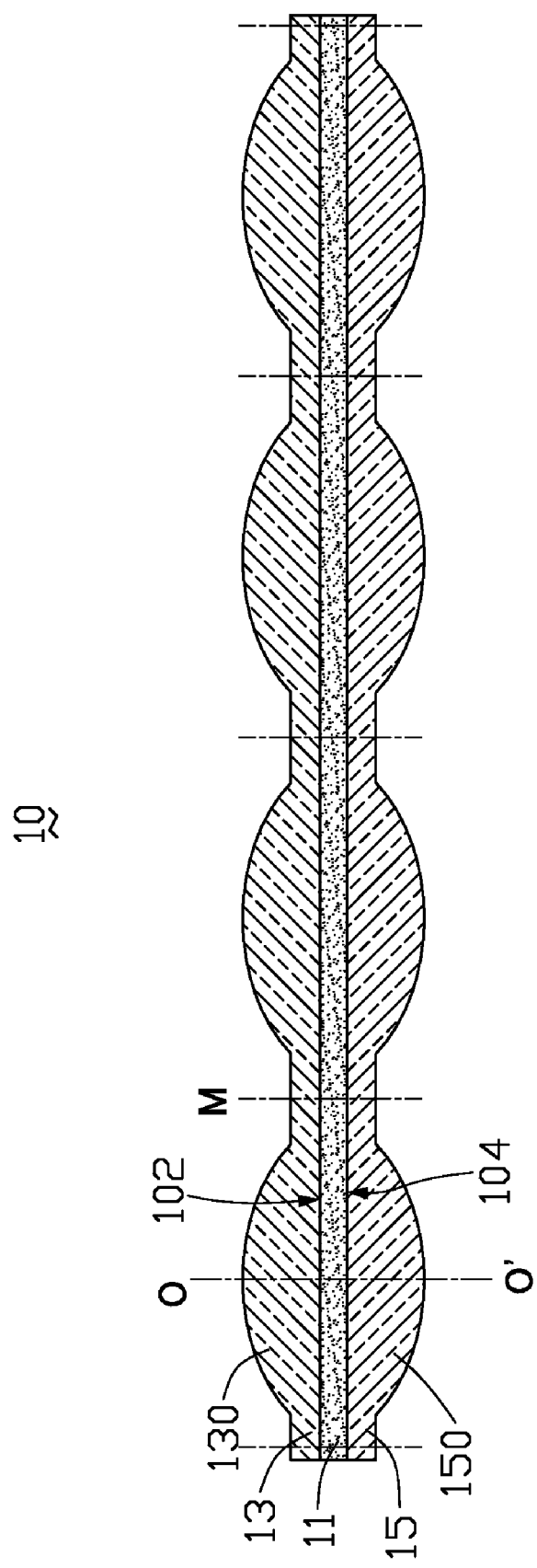
FIG. 9 is a schematic, side cross-sectional view of a compound lens array, in accordance with an eighth embodiment.

Thirdly, a second plastic lens array 15 is formed on the second surface 104 of the light pervious layer 11 by UV embossing, thus obtaining a compound lens array 10 (see FIG. 9). The second plastic lens array 15 includes a plurality of the second plastic lenses 150. Each second plastic lens 150 has an identical optical axis OO' as each corresponding first plastic lens 130. A material of the first plastic lens array 13 is different from that of the second plastic lens array 15.

Fourthly, the compound lens array is diced along the cutting lines M to obtain a plurality of compound lenses 100, one of which is shown in FIG. 1.

Figure 10:
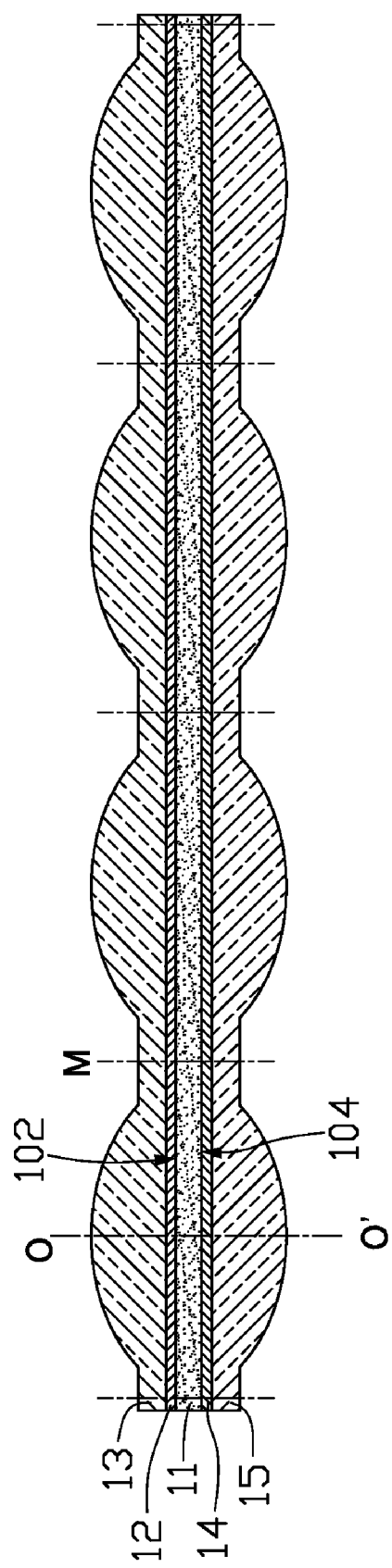
FIG. 10 is a schematic, side cross-sectional view of a compound lens array, in accordance with a ninth embodiment.

In order to make the compound lens array 100 of FIG. 5, prior on forming the first plastic lens array 13 and the second plastic lens array 15, a filter layer 12 and an anti-reflection layer 14 are formed on a first surface 102 and a second surface 104 by sputtering, respectively (see FIG. 10).

Figure 11:
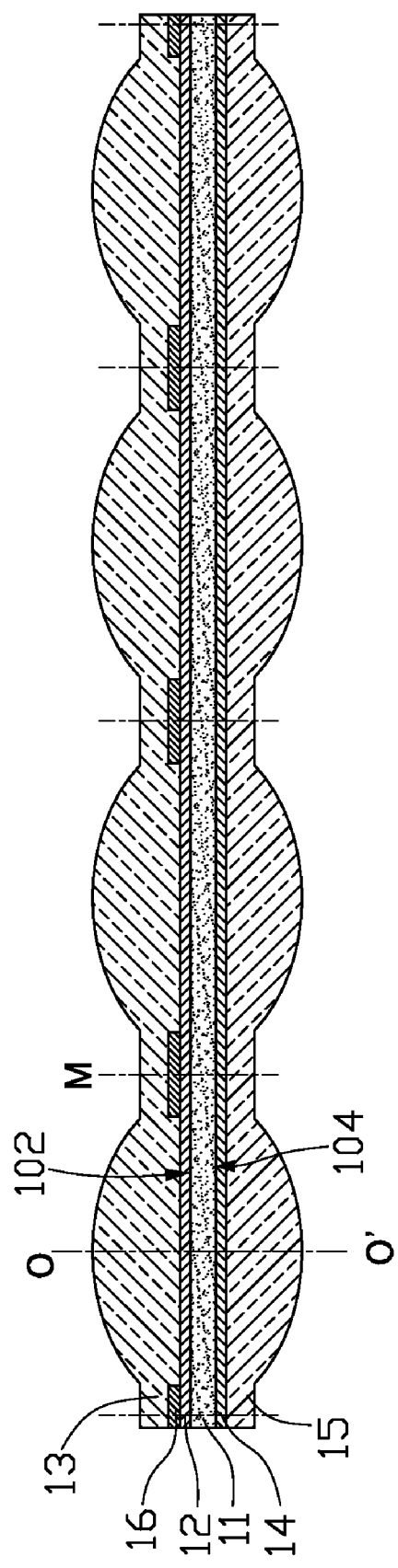
FIG. 11 is a schematic, side cross-sectional view of a compound lens array, in accordance with a tenth embodiment.

Furthermore, in order to make the compound lens array 100 of FIG. 7, prior on forming the first plastic lens array 13 an aperture layer 16 is formed on the filter layer 12 by sputtering (see FIG. 11).

In the above method for making the compound lens 100, the first plastic lens array 13 and the second plastic lens array 15 are formed by UV embossing. It is to be understood that the first plastic lens array 13 and the second plastic lens array 15 can be formed by other embossing method, e.g., hot embossing. When the first plastic lens array 13 and the second plastic lens array 15 are formed using hot embossing, a glass transition temperature of the first plastic lens array 13 can be different from that of the second plastic lens array 15.

The compound lens 100 can be produced in an array format using wafer-level techniques. The compound lens 100 has a small size, so camera modules employing the compound lens 100 are correspondingly small. Therefore, the compound lens 100 meets the miniaturization requirement of camera modules.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A compound lens, comprising:
 a rigid light pervious layer comprising a first surface and a second surface opposite to the first surface;
 a first plastic lens attached on the first surface, the first plastic lens being comprised of a first material; and
 a second plastic lens formed on the second surface, the second plastic lens being comprised of a second material, a refractive index of the first material being different from that of the second material, an optical axis of the first plastic lens being in alignment with an optical axis of the second plastic lens.

2. The compound lens as claimed in claim 1, wherein the light pervious layer is comprised of glass or quartz.

3. The compound lens as claimed in claim 1, further comprising a filter layer sandwiched between the first surface and the first plastic lens.

4. The compound lens as claimed in claim 1, further comprising a filter layer formed on a surface of the first plastic lens facing away from the first surface of the rigid light pervious layer.

5. The compound lens as claimed in claim 4, wherein the filter layer comprises an infrared filter or an infrared band pass filter.

6. The compound lens as claimed in claim 1, further comprising an anti-reflection layer formed on a surface of the first plastic lens facing away from the first surface of the rigid light pervious layer.

7. The compound lens as claimed in claim 1, further comprising an anti-reflection layer sandwiched between the first surface and the first plastic lens.

8. The compound lens as claimed in claim 1, further comprising an aperture layer formed on a surface of the first plastic lens facing away from the first surface of the rigid light pervious layer.

9. The compound lens as claimed in claim 1, further comprising an aperture layer sandwiched the first surface and the first plastic lens.

10. The compound lens as claimed in claim 1, wherein the aperture layer is comprised of chromium or aluminum.

11. The compound lens as claimed in claim 1, wherein the first plastic lens comprises a plane convex lens or a plane concave lens.

12. A compound lens array comprising:
 a light pervious layer comprising a first surface and an opposite second surface;
 a first plastic lens array formed on the first surface, the first plastic lens array comprising a plurality of first plastic lenses, the first plastic lens array being comprised of a first material; and
 a second plastic lens array formed on the second surface, the second plastic lens array comprising a plurality of second plastic lenses, the second plastic lens array being comprised of a second material, a refractive index of the first material being different from that of the second material, each second plastic lens being spatially corresponding to the corresponding first plastic lens, an optical axis of each second plastic lens being in alignment with that of the corresponding first plastic lens.

13. The compound lens array as claimed in claim 12, further comprising a filter layer sandwiched between the first surface and the first plastic lens array.

14. The compound lens array as claimed in claim 12, further comprising an anti-reflection layer sandwiched between the first surface and the first plastic lens array.

15. The compound lens array as claimed in claim 12, further comprising an aperture layer sandwiched the first surface and the first plastic lens array or formed on a surface of the first plastic lens array facing away from the first surface of the rigid light pervious layer.

16. A compound lens comprising:
    a rigid light pervious layer comprising a first surface and an opposite second surface;
    a first plastic lens embossed on the first surface, the first plastic lens being comprised of a first material; and
    a second plastic lens embossed on the second surface, the second plastic lens being comprised of a second material, a refractive index of the first material being different from that of the second material, the first plastic lens being in coaxially alignment with the second plastic lens, the light pervious layer being comprised of a material different from the first and second materials.

17. The lens as claimed in claim 16, further comprising a filter layer sandwiched between the first surface and the first plastic lens.

18. The lens as claimed in claim 16, further comprising an anti-reflection layer sandwiched between the first surface and the first plastic lens.

19. The lens as claimed in claim 16, further comprising an aperture layer sandwiched the first surface and the first plastic lens or formed on a surface of the first plastic lens facing away from the first surface of the rigid light pervious layer.

* * * * *